United States Patent [19]
Soeda et al.

[11] Patent Number: 5,382,974
[45] Date of Patent: Jan. 17, 1995

[54] MOVIE CAMERA HAVING STILL PICTURE PHOTOGRAPHING FUNCTION AND METHOD OF PHOTOGRAPHING STILL PICTURE THEREWITH

[75] Inventors: Haruo Soeda; Makoto Tsugita, both of Tokyo, Japan

[73] Assignee: Fuji Photo Film Company, Limited, Kanagawa, Japan

[21] Appl. No.: 107,973

[22] Filed: Oct. 1, 1993

Related U.S. Application Data

[62] Division of Ser. No. 868,530, Apr. 15, 1992, abandoned.

[30] Foreign Application Priority Data

Apr. 18, 1991 [JP] Japan .................................. 3-86720
Apr. 18, 1991 [JP] Japan .................................. 3-86820

[51] Int. Cl.⁶ .......................................... H04N 5/225
[52] U.S. Cl. ...................................... 348/221; 348/229
[58] Field of Search ............... 348/221, 220, 239, 207, 348/228; 358/906, 903, 335, 341, 342, 343; H04N 5/225, 5/30; 354/75

[56] References Cited

U.S. PATENT DOCUMENTS

| | | |
|---|---|---|
| 4,663,669 | 5/1987 | Kinoshita et al. |
| 4,714,963 | 12/1987 | Vogel |
| 4,714,966 | 12/1987 | Saito et al. |
| 4,746,988 | 5/1988 | Nutting et al. |
| 4,783,565 | 11/1988 | Hasuda et al. |
| 4,829,384 | 5/1989 | Iida et al. |
| 4,837,628 | 6/1989 | Sasaki |
| 4,910,600 | 3/1990 | Kinoshita et al. |
| 4,937,673 | 6/1990 | Saito et al. |
| 5,019,911 | 5/1991 | Okino et al. |

Primary Examiner—Joseph Mancuso
Assistant Examiner—Tuan V. Ho

[57] ABSTRACT

A movie camera and a method of photographing a still with the movie camera is provided wherein the movie camera is of a type wherein a motionless picture or still can be photographed during a movie photography operation and when the illumination falling on an object is a predetermined value or less at the start in the photography of the still during the movie photography operation, stroboscopic flashes of light are produced from a strobe device to enable still photography. The movie camera basically includes a CCD for converting image information corresponding to light incident on a lens into an electric signal, a movie-photography triggering signal generating device for starting a movie photography operation, a still-photography triggering signal generating device for starting a still photography operation, and an electronic shutter speed switching device for changing over the shutter speed to a desired shutter speed faster than that at the time of the movie photography when the still-photography triggering signal generating device is activated to start the still photography operation during the movie photography operation. According to the above construction, the strobe device automatically produces flashing light in synchronism with the shutter timing of a high-speed operated shutter for thereby enabling instant photography of a desired motionless picture.

28 Claims, 7 Drawing Sheets

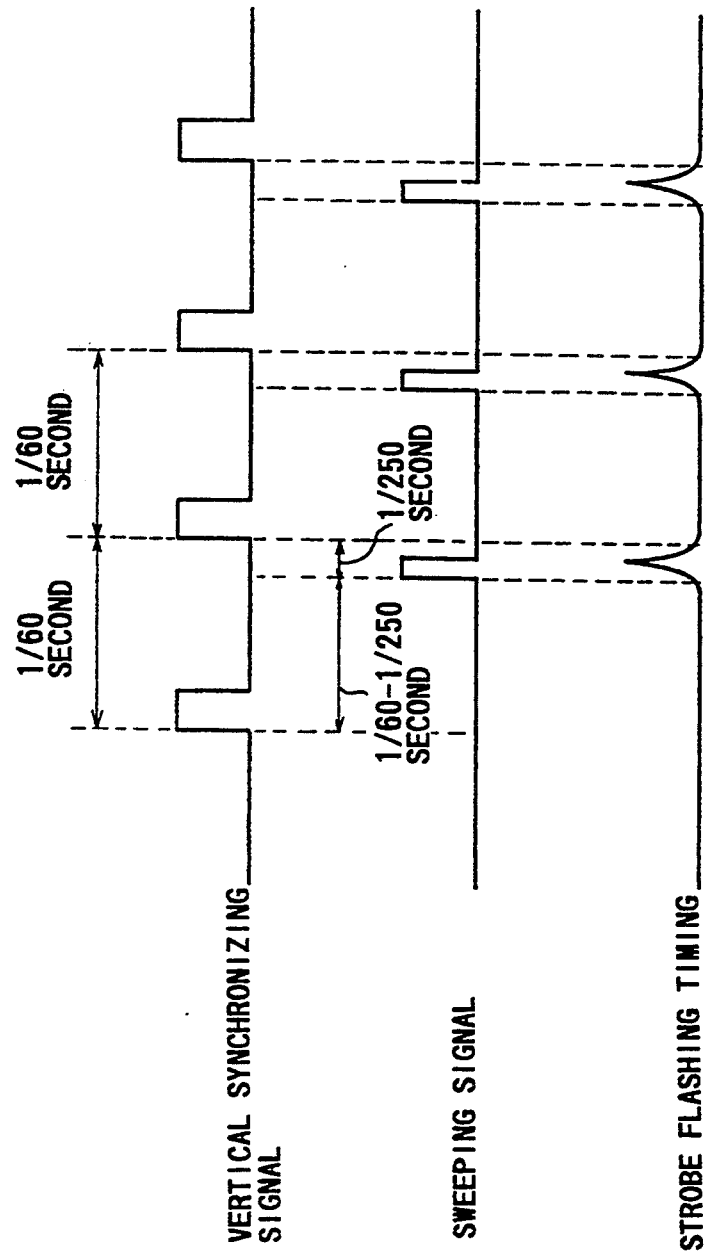

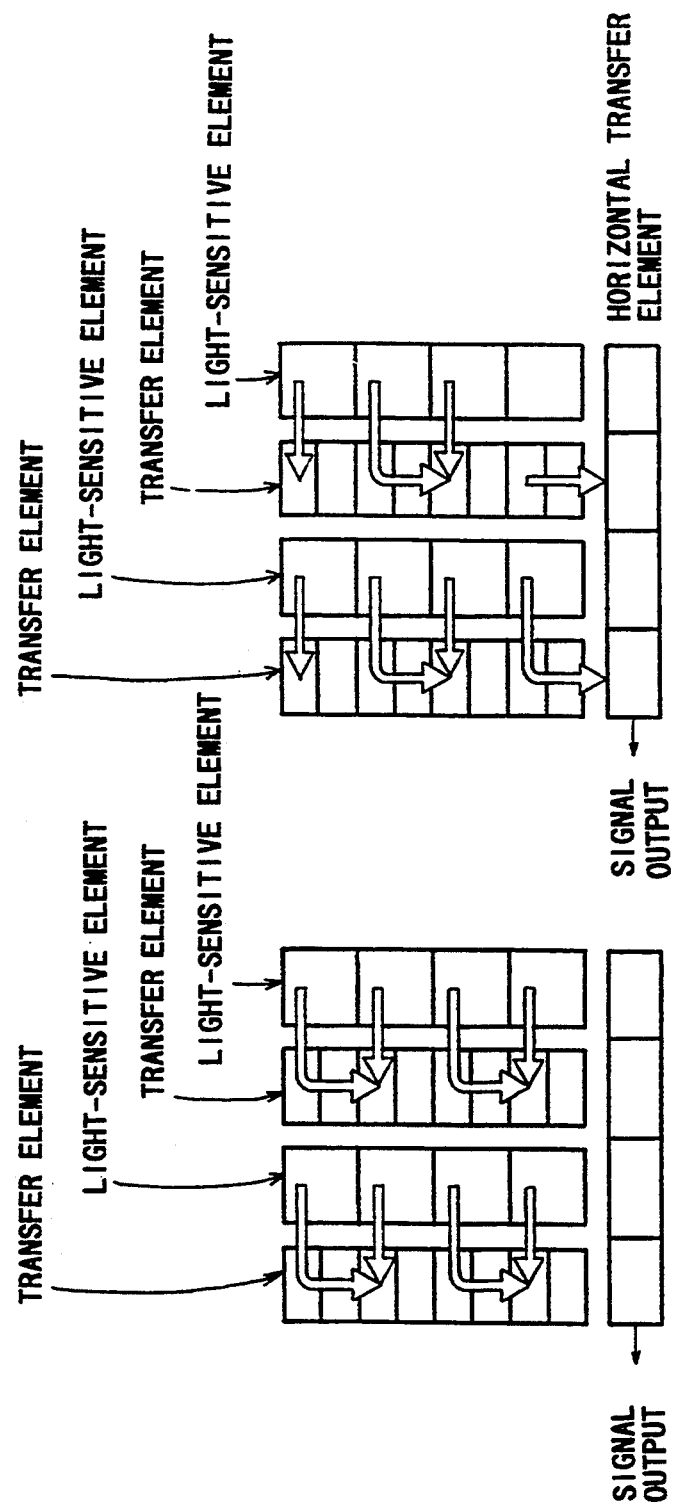

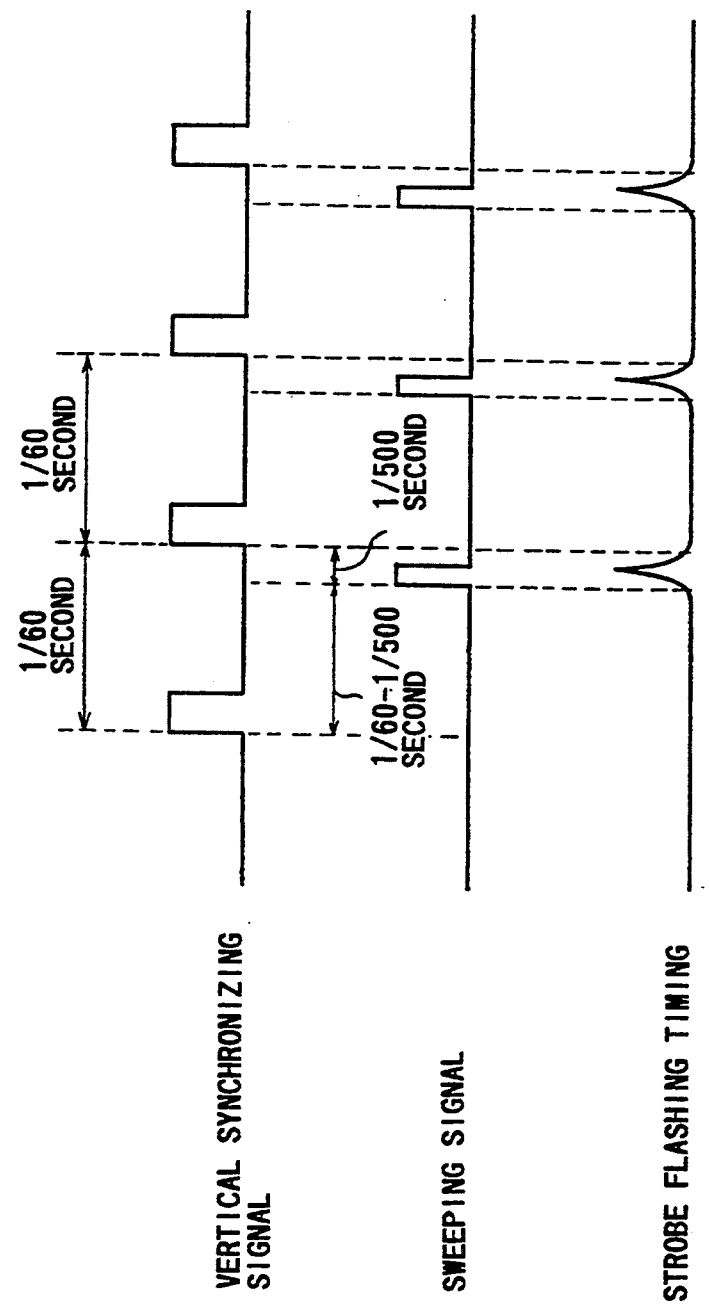

MOVIE CAMERA HAVING STILL PICTURE PHOTOGRAPHING FUNCTION AND METHOD OF PHOTOGRAPHING STILL PICTURE THEREWITH

This application is a divisional of copending application Ser. No. 07/868,530, filed on Apr. 15, 1992, now abandoned the entire contents of which are hereby incorporated by reference.

BACKGROUND OF THE INVENTION

1. Field of the Invention

The present invention relates to a movie camera of a type wherein a still picture (hereinafter called a "still") can be photographed during a motion picture (hereinafter called a "movie") photography operation and when the illumination falling on an object is less than or equal to a predetermined value at the start of the still photography during the movie photography operation, stroboscopic flashes of light are produced from a strobe device to enable the still photography. Also, the present invention relates to a method of photographing the still with the movie camera.

2. Description of the Related Art

There has recently been widespread use of a movie camera in view of the fact that a movie can easily be photographed. When a photographer is photographing a movie of an object or subject using the movie camera, there has been a demand for the photography of a desired still of the object. That is, if it is possible to carry out the still photography during the movie photography operation and to continuously make the movie photography, a reproduced image of a desired still as well as a reproduced image of a continuous movie can be obtained.

When an image or picture photographed in a normal movie photography state is reproduced as a motionless picture, i.e., a still, there is often a situation in which blurring occurs in an object and hence a distinct image cannot be produced. This results from the fact that the shutter speed at the time of the movie photography is generally relatively longer, i.e., the shutter speed is set to 1/60 second. On the other hand, when a still photographed at a shutter speed of 1/250 second, for example, is reproduced as a movie, an object is awkward in its action, thus causing a problem that a movie which exhibits a smooth movement cannot be obtained.

Thus, when it is desired to cause a movie photographing function and a still photographing function to coexist with each other in the conventional movie camera, it is actually difficult to apply both of the still and the movie to the movie camera. That is, when the photography mode is changed from a movie photography mode to a still photography mode, it is preferable that the shutter speed is normally made faster than that at the movie photography mode, and a still is photographed under this condition.

As one of movie cameras, there has also been widespread use of a 8-mm video camera capable of easily photographing a movie. This type of 8-mm video camera has a lens whose effective aperture diameter d is less than or equal to 25 mm, and a zoom lens having a zoom ratio: at least 6× (times).

In a normally-used 35-mm compact camera, on the other hand, a focal distance f is equal to 260 mm (i.e., f=260 mm) during zooming at a 6× zoom ratio. When an effective aperture diameter d of a lens is set equal to 25 mm (i.e., d=25 mm), an F-number for indicating the brightness of the lens becomes about 11 (F=f/d).

When strobe photography is carried out by using the 35-mm compact camera under the condition that a guide number (G.N.) is 12 (standard sensitivity), a photographable maximum distance L is limited to about 1.1 m (L=G.N.÷F).

On the other hand, there has been a demand for the photography of a desired still as well as a movie in the 8-mm video camera. There has been a further demand for the photography of a still with stroboscopic flashing light even in the dark.

The present invention has been completed to meet with the above demands. Thus, the size of a screen can be extremely reduced if a ⅓-inch type CCD which has recently been developed is used. Therefore, a focal length f becomes 33 mm (i.e., f=33 mm) even if a lens having an effective aperture diameter (d=25 mm) identical to that referred to above is employed. Correspondingly, an F-number of the lens becomes about 1.4 (F=f/d). This is the point to which the present invention has paid attention.

SUMMARY OF THE INVENTION

It is a general object of the present invention to provide a movie camera having a movie photographing function and a still photographing function in the same manner as in the conventional movie camera, of a type wherein even if a photographed movie portion and a photographed still portion exists together upon photography, the entire picture can be reproduced in the form of a smooth motion picture and a desired picture, which is superior in quality, can be produced even in the form of a motionless picture, and to provide a method of photographing a motionless picture with the movie camera during a movie photography operation.

It is a principal object of the present invention to provide a movie camera with a small-sized charge-coupled device incorporated therein, which has a still photographing function and a strobe device and is capable of making a photographable maximum distance longer and obtaining an image which is superior in quality, and to provide a method of photographing a still with the movie camera during a movie photography operation.

It is another object of the present invention to provide a movie camera having a still photographing function, which is capable of photographing a still during a movie photography operation. The movie camera comprising a solid-state image sensing device for converting image information corresponding to light incident on a lens into an electric signal, movie-photography triggering signal generating means for starting a movie photography operation, still-photography triggering signal generating means for starting a still photography operation, and electronic shutter speed switching means for electrically changing over the electronic shutter speed to a desired shutter speed faster than that at the time of the movie photography when the still-photography triggering signal generating means is activated to start the still photography operation during the movie photography operation.

It is a further object of the present invention to provide a movie camera wherein the solid-state image sensing device comprises a CCD.

It is a still further object of the present invention to provide a movie camera wherein the electronic shutter speed switching means comprises a CCD drive circuit for energizing the CCD, an SSG circuit for supplying a vertical synchronizing signal to the CCD drive circuit, and a still controller for supplying an electric signal to the SSG circuit, the still controller being activated to supply a sweeping signal to the CCD drive circuit via the SSG circuit to cause signal charges stored in the CCD to be discharged for a predetermined period of time, for thereby changing over the electronic shutter speed to the desired electronic shutter speed faster than that at the time of the movie photography.

It is a still further object of the present invention to provide a movie camera having a still photographing function, which is capable of photographing a still during a movie photography operation. The movie camera comprising a strobe device for illuminating an object with stroboscopic flashes of light a solid-state image sensing device for electrically converting image information corresponding to light incident on a lens into an electric signal, movie-photography triggering signal generating means for starting a movie photography operation, still-photography triggering signal generating means for starting a still photography operation, a solid-state image sensing device for electrically converting image information of the object into an electric signal, object illumination determining means for determining whether or not the illumination falling on the object has reached a predetermined value, and strobe flashing light controlling means for activating the strobe device when the still-photography triggering signal generating means is energized to start the still photography operation during the movie photography operation and the object illumination determining means determines that the illumination falling on the object is less than the predetermined value, for thereby producing stroboscopic flashes of light.

It is a still further object of the present invention to provide a movie camera wherein the object illumination determining means comprises an iris position detector for detecting the opening and closing conditions of an iris, an AGC circuit for controlling the gain of an input image signal, and a still controller activated in response to a triggering signal output from the still-photography triggering signal generating means and electrically connected to the strobe device, the still controller being activated to determine on the basis of iris information of an object from the iris position detector and gain information from the AGC circuit whether or not the illumination falling on the object has reached a predetermined value.

It is a still further object of the present invention to provide a movie camera wherein the strobe device comprises a strobe switch for triggering the strobe device, a charging unit for charging a battery, a strobe control unit for controlling the strobe device, and a stroboscopic flashing light producing unit for producing stroboscopic flashes of light, the still controller being activated to supply a desired signal to the strobe control unit and thereby illuminating an object with the stroboscopic flashes of light produced from the stroboscopic flashing light producing unit.

It is a still further object of the present invention to provide a method of photographing a still with a movie camera having a still photographing function, comprising the steps of: a first step of energizing still-photography triggering signal generating means during a movie photography operation so as to start a still photography operation, a second step of reading image information of an object as a signal by a CCD and determining by a still controller the gain of an AGC circuit obtained by amplifying the read signal with the AGC circuit, a third step of activating the still controller in such a manner for determining whether a strobe switch has been brought to an on or off state, setting the gain of the AGC circuit determined in the second step to a predetermined gain and setting the electronic shutter speed to a predetermined electronic shutter speed for thereby photographing a still, and a fourth step of de-energizing the still-photography triggering signal generating means after the still photography has been completed, for thereby returning to movie photography.

It is a still further object of the present invention to provide a method wherein the third step further includes a step wherein if it is determined that the gain of the AGC circuit is of 0 dB and the strobe switch has been brought to the off state, then the still controller is activated to increase the gain of the AGC circuit to 12 dB and to supply a desired signal to a CCD drive circuit through an SSG circuit for thereby setting the electronic shutter speed to an electronic shutter speed of 1/250 second.

It is a still further object of the present invention to provide a method wherein the third step further includes a step wherein if it is determined that the gain of the AGC circuit falls between 0 dB and 3 dB and the strobe switch has been brought to the off state, then the still controller is activated to increase the gain of the AGC circuit to 12 dB and to supply a desired signal to the CCD drive circuit through the SSG circuit so as to set the electronic shutter speed to an electronic shutter speed of 1/180 second, for thereby photographing a still.

It is a still further object of the present invention to provide a method wherein the third step further includes a step wherein if it is determined that the gain of the AGC circuit falls between 3 dB and 6 dB and the strobe switch has been brought to the off state, then the still controller is activated to increase the gain of the AGC circuit to 12 dB and to supply a desired signal to the CCD drive circuit through the SSG circuit so as to set the electronic shutter speed to an electronic shutter speed of 1/125 second, for thereby photographing a still.

It is a still further object of the present invention to provide a method wherein the third step further includes a step wherein if it is determined that the gain of the AGC circuit is more than or equal to 6 dB and the strobe switch has been brought to the off state, then the still controller is activated to supply a desired signal to the CCD drive circuit through the SSG circuit so as to set the electronic shutter speed to an electronic shutter speed of 1/60 second, for thereby photographing a still.

It is a still further object of the present invention to provide a method wherein the third step further includes a step wherein if it is determined that the gain of the AGC circuit is greater than or equal to 0 dB and the strobe switch has been brought to the on state, then the still controller is activated to set the gain of the AGC circuit to 0 dB and to supply a desired signal to the CCD drive circuit via the SSG circuit so as to set the electronic shutter speed to an electronic shutter speed of 1/250 second, for thereby photographing a still in a strobe mode.

It is a still further object of the present invention to provide a method wherein the strobe mode comprises the following processes: a first process of supplying information d about the distance to an object to the still controller based on AF information from a focus position detector circuit, a second process of generating a desired signal from the still controller to set the gain of the AGC circuit to 0 dB when the distance information d input to the still controller in the first process is less than or equal to 8.5 m and supplying a desired signal to a strobe control unit from the still controller so as to produce stroboscopic flashes of light from a stroboscopic flashing light producing unit, for thereby photographing a still, a third process of generating a desired signal from the still controller to set the gain of the AGC circuit to 6 dB when the distance information d input to the still controller in the first process falls between 8.5 m and 12 m and supplying a desired signal to the strobe control unit from the still controller so as to produce stroboscopic flashes of light from the stroboscopic flashing light producing unit, for thereby photographing a still, a fourth process of generating a desired signal from the still controller to set the gain of the AGC circuit to 12 dB when the distance information d input to the still controller in the first process falls between 12 m and 17 m and supplying a desired signal to the strobe control unit from the still controller so as to produce stroboscopic flashes of light from the stroboscopic flashing light producing unit, for thereby photographing a still, and a fifth process of generating a desired signal from the still controller to set the gain of the AGC circuit to 18 dB when the distance information d input to the still controller in the first process is more than or equal to 17 m and supplying a desired signal to the strobe control unit from the still controller so as to produce stroboscopic flashes of light from the stroboscopic flashing light producing unit, for thereby photographing a still.

It is a still further object of the present invention to provide a method of photographing a still with a movie camera having a still photographing function, comprising the steps of: energizing still-photography triggering signal generating means during a movie photography operation so as to start a still photography operation, supplying a desired signal to a CCD drive circuit from a still controller through an SSG circuit so as to set the electronic shutter speed to a given electronic shutter speed, inputting iris information of an object from an iris position detector used to detect the opening and closing conditions of an iris and gain information from an AGC circuit to the still controller and causing the still controller to determine based on said iris and gain information whether or not the illumination falling on the object falls within the minimum allowable value, causing the still controller to set up given white balance corresponding to strobe photography and supplying a signal indicative of the set-up white balance information to an AWB circuit if the answer is determined to be yes in the illumination determining step, activating the still controller in a manner so as to supply a sweeping signal to the CCD drive circuit via the SSG circuit in synchronism with a vertical synchronizing signal of 1/60 second output from the SSG circuit, and storing signal charges in the CCD according to the electronic shutter speed when the sweeping signal is input to the CCD drive circuit and activating the still controller so as to supply a desired signal to a strobe control unit in synchronism with the timing of the electronic shutter speed, for thereby energizing the strobe device in unison with the electronic shutter timing at the time of the still photography so as to enable the strobe device to automatically produce stroboscopic flashes of light.

It is a still further object of the present invention to provide a method wherein the electronic shutter speed is 1/500 second.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 5 is a timing chart for describing the timing at which a motionless picture is photographically recorded by the movie camera;

FIGS. 6(a) and 6(b) are diagrams for describing the manner in which signal charges are stored in a CCD; and FIG. 7 is a timing chart for describing the timing at which stroboscopic flashes of light are produced in synchronism with the timing of an electronic shutter when a still photography is carried out by the movie camera.

DETAILED DESCRIPTION OF THE PREFERRED EMBODIMENTS

Figure 1:
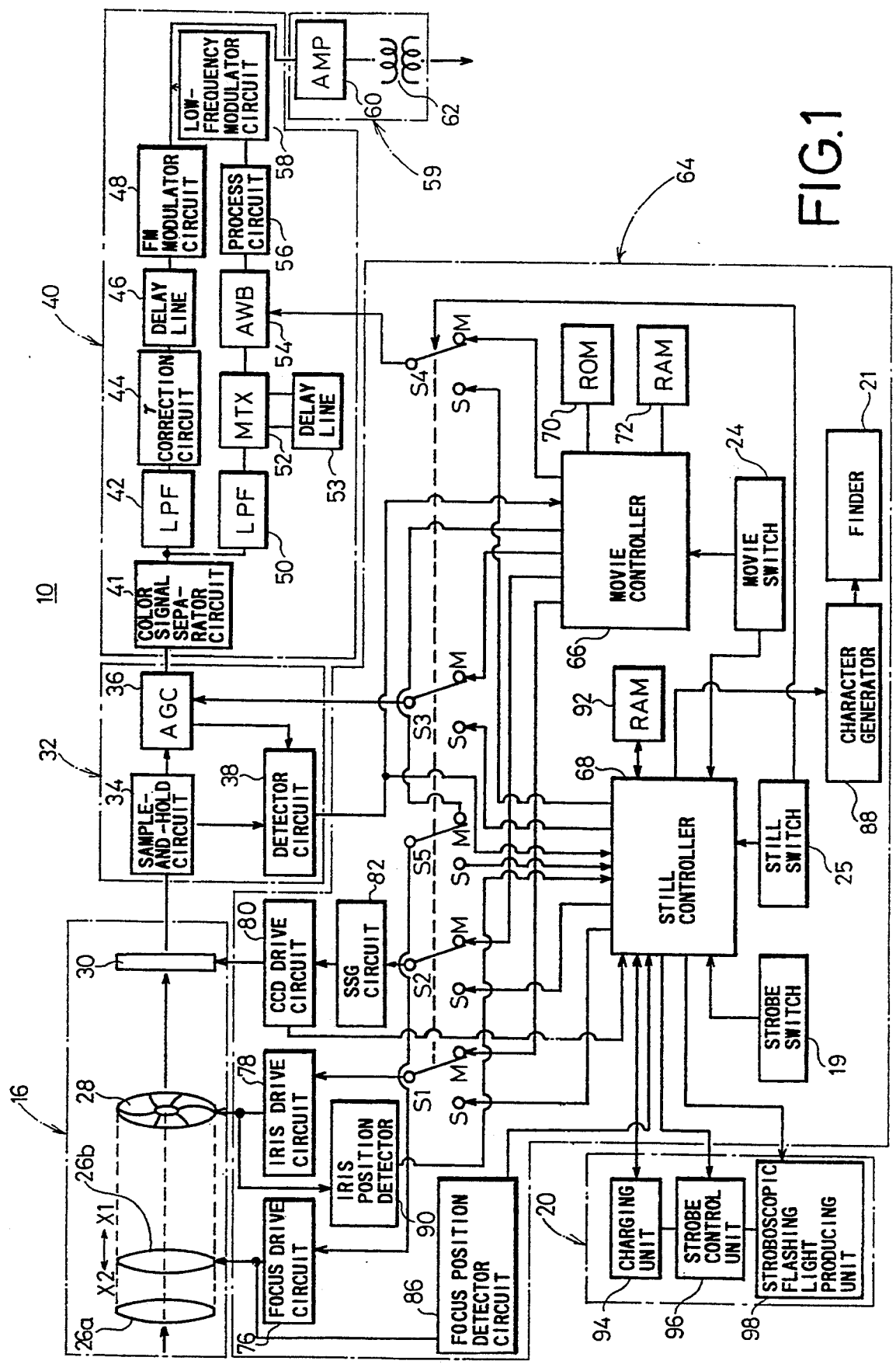
FIG. 1 is a block diagram showing the structure of a movie camera according to one embodiment of the present invention.
Figure 2:
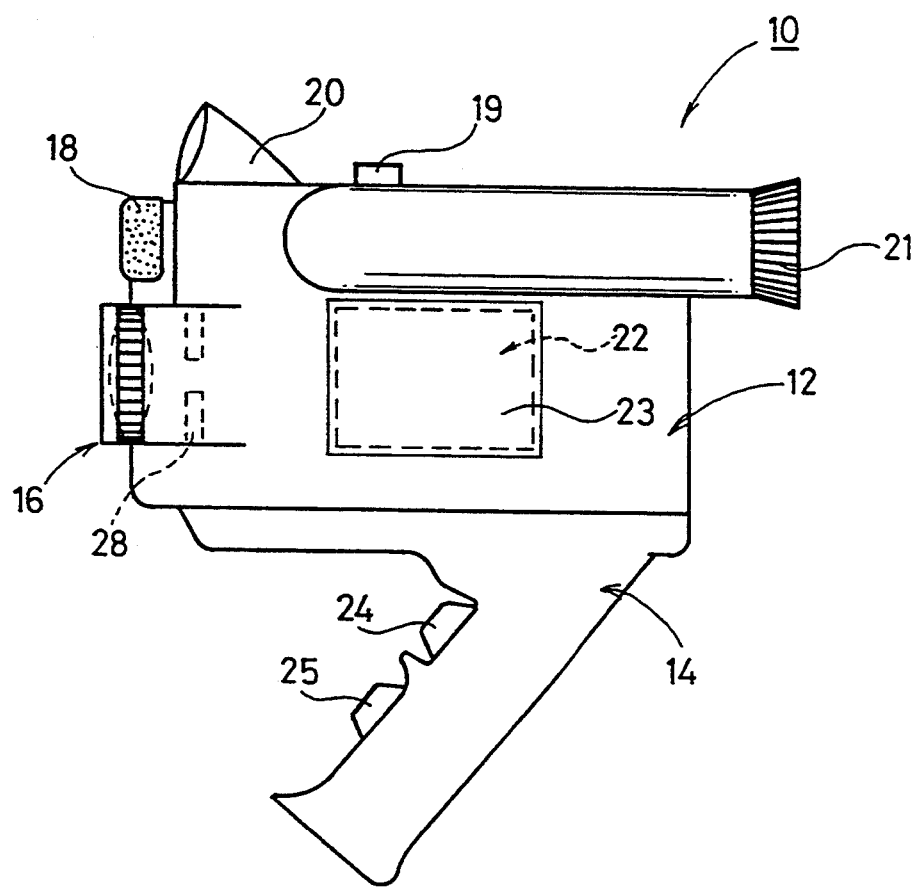
FIG. 2 is a side view showing the external appearance of the movie camera shown in FIG. 1.

FIG. 1 is a block diagram showing the structure of a movie camera according to one embodiment of the present invention. FIG. 2 is a side view showing the external appearance of the movie camera.

In FIG. 2, reference numeral 10 indicates a movie camera, which includes a camera body 12 and a grip 14. The camera body 12 includes an optical system 16, a highly directional microphone 18, a hop-up type strobe 20, a strobe switch 19 for actuating or triggering the strobe 20, a finder 21 and a cassette loading unit 23 for loading a video cassette 22 therein. The grip 14 has a switch (hereinafter called a "movie switch") 24 for motion picture or movie photography and a switch (hereinafter called a "still switch") 25 for still image or picture photography. When a photographing button is turned on, the still switch 25 automatically starts to make the still photography in the course of the movie photography. At this timer a motionless picture, i.e., a still corresponding to one field alone is photographed within a desired region. When the button is turned off, a still photography operation can automatically be set to a movie photography operation again.

In FIG. 1, the optical system 16 includes photo-taking or converging lenses 26a, 26b, a diaphragm 28 called an iris and a CCD 30 for electrically reading or sensing information about an image focused thereon.

A signal processing unit 32 includes a sample-and-hold circuit 34 for sampling and holding an image signal read by the CCD 30, an AGC circuit 36 as a gain controller for controlling the gain of the image signal, and a detector circuit 38 for taking out a signal used to control the focus and the iris or the like from the image signal.

An image processing unit 40 includes a color signal separator circuit 41 for separating the image signal into color signals indicative of the three primary colors, a low-pass filter (hereinafter called an "LPF") 42 for extracting or sampling a luminance signal, a γ correction circuit 44 for subjecting the luminance signal to γ correction, a delay line 46 for subjecting the output from the γ correction circuit 44 to a contour or outline emphasis process, and an FM modulator circuit 48 for FM-modulating the luminance signal processed by the above devices. Further, the image processing unit 40 also includes an LPF 50 for extracting color signals such as a CR, a CB, etc. and a luminance signal YL from the image signal output from the color signal separator circuit 41, a matrix (hereinafter called an "MTX") for converting these signals into color signals R1, G1, B1, a delay line 53 electrically connected to the MTX circuit 52, an AWB (Auto White Balance) circuit 54, a process circuit 56 for converting the color signals R, G, B indicative of the three primary colors output from the AWB circuit 54 into a chroma signal, and a low-frequency modulator circuit 58 for subjecting the chroma signal to a low-frequency modulating process.

An image recording unit 59 includes an amplifier (AMP) 60 for amplifying signals output from the FM modulator circuit 48 and the low-frequency modulator circuit 58, a magnetic head 62 for recording image information in a video cassette 22, etc.

A control unit 64 includes a movie controller 66 and a still controller 68. Connected to the movie controller 66 are a ROM 70 for storing therein a program used to control the movie camera 10, a RAM 72 for temporarily storing therein information being under control, the movie switch 24, and the detector circuit 38. Also connected to the movie controller 66 are a focus drive circuit 76 for activating the lens 26b, an iris drive circuit 78 for opening and closing the diaphragm 28, a CCD drive circuit 80 serving as an electronic shutter speed switching unit, an SSG (Synchronism Signal Generator) for generating a synchronizing signal used to energize the CCD drive circuit 80, the AGC circuit 36 and the AWB circuit 54.

In this case, the iris drive circuit 78 is electrically connected to a common terminal of a switch S1. The movie controller 66 is electrically connected to an M terminal of the switch S1. Therefore, the iris drive circuit 78 and the movie controller 66 are electrically connected to each other by the switch S1. Similarly, the SSG circuit 82, the AGC circuit 36, the AWB circuit 54 and the focus drive circuit 76 are electrically connected via a switch S2, a switch S3, a switch S4 and a switch S5, respectively, to the movie controller 66.

When the switches S1 through S5 are changed over to respectively corresponding S terminals, the output terminals of the still controller 68 are electrically connected to the iris drive circuit 78, the SSG circuit 82, the AGC circuit 36, the AWB circuit 54 and the focus drive circuit 76, respectively. The still controller 68 is electrically connected to the still switch 25, the strobe switch 19 and a character generator 88 for generating characters used to indicate comments in the finder 21. Also connected to the still controller 68 are the detector circuit 38, an iris position detector 90 for detecting the opening and closing conditions of the iris, and a RAM 92. Further, the still controller 68 is electrically connected with a charging unit 94 of the strobe 20, a strobe control unit 96 and a stroboscopic flashing light producing unit 98. Furthermore, the still controller 68 is electrically connected with a focus position detector circuit 86 for detecting information about the distance to an object or subject to be photographed, the CCD drive circuit 80 and the movie switch 24.

When the output terminal of the still switch 25 is electrically connected to control terminals of the switches S1 through S5 and the triggering action of the still switch 25 is made, the changeover of the switches S1 through S5 is made.

In this case, the detector circuit 38 serves as a high-frequency extracting unit. Further, the 92 serves as a storing unit and the still controller 68 serves as a controlling unit.

The operation of the movie camera 10 which is constructed as described above and photographs the movie and the still, will now be described below with reference to FIGS. 1 through 4.

When the movie switch 24 is first operated, the movie controller 66 reads an initial value for the movie photography from the RAM 72 so as to cause the SSG circuit 82 to control the CCD drive circuit 80, for thereby setting the shutter speed to 1/60 second and setting the amplification degree or gain, i.e., the gain of the AGC circuit 36 to 0 dB as a reference. Then, the CCD 30 electrically reads information about an image focused thereon in synchronism with a vertical synchronizing signal of 1/60 second, which is output from the SSG circuit 82 so as to produce an image signal. The image signal is sampled and held by the sample-and-hold circuit 34, followed by transfer to the detector circuit 38 and the AGC circuit 36. After that, the detector circuit 38 extracts focus information from the image signal input thereto and outputs the focus information to the movie controller 66.

On the other hand, the detector circuit 38 extracts exposure information from the image signal input via the AGC circuit 36 from the sample-and-hold circuit 34 and outputs the exposure information to the movie controller 66. That is, the detector circuit 38 detects the image signals output from the sample-and-hold circuit 34 and the AGC circuit 36 so as to extract the focus information and the exposure information from the image signals, which is followed by transfer to the movie controller 66. The movie controller 66, which has been supplied with the focus information, e.g., information about a so-called Front Focus (front pin), which is brought to the object side of, and in front of, the CCD 30 rather than a focusing surface of the CCD 30, is activated to cause the focus drive circuit 76 to energize an unillustrated motor or the like in accordance with the front pin information. Accordingly, the motor displaces the lens 26b toward the CCD 30 (i.e., in the direction indicated by the arrow X1 in FIG. 1) along the optical axis in such a manner that an image of an object is focused on the CCD 30.

Likewise, the movie controller 66, which has been supplied with the exposure information output from the detector circuit 38, e.g., information indicative of the amount of light lower than an appropriate amount of light, is operated to energize the iris drive circuit 78 to omen the diaphragm 28 which includes iris blades for thereby increasing the amount of light. When underexposure occurs even if the diaphragm 28 is opened to a maximum at this time, the movie controller 66 outputs a control signal to the AGC circuit 36 to obtain a suitable exposure so as to actuate an unillustrated amplification-gain changeover switch, for thereby increasing the amplification factor, i.e. the amplification gain. At this time, the iris position detector 90 detects the opening state of the diaphragm 28 and supplies the opening state to the still controller 68.

On the other hand, the image signal output to the color signal separator circuit 41 from the AGC circuit 36 is separated into a luminance signal and a color signal, with the luminance signal being subjected to an offset removing process in the LPF 42, and is followed by being subjected to a γ correction of 0.45 in the γ correction circuit 44. Further, the so-processed luminance signal is processed for the outline emphasis by the delay line 46 and then FM-modulated by the FM modulator circuit 48, which is followed by inputting the processed luminance signal to the AMP 60. Then, a signal indicative of YL, CR and CB is extracted from the image signal output to the LPF 50 from the color signal separator circuit 41 so as to be converted into a color signal indicative of R1, G1 and B1 by the MTX circuit 52 under the action of the delay line 53. Thereafter, the converted color signal is subjected to white balance adjustment of the AWB circuit 54, and then converted into a chroma signal in the process circuit 56, which is followed by a transfer to the low-frequency modulator circuit 58.

The chroma signal is brought to a color signal subjected to the low-frequency modulating processing the low-frequency modulator circuit 58, which is followed by delivering the processed chroma signal to the AMP 60. The produced color signal is amplified by the AMP 60 together with the luminance signal input from the FM modulator circuit 48. Thereafter, the amplified color signal is supplied to the magnetic head 62, and is magnetically recorded in the video cassette 22 as image information.

A description will now be made of a case in which when the above movie photography is being performed, the photographer turns on the still switch 25 to start the still photography operation.

Figure 3:
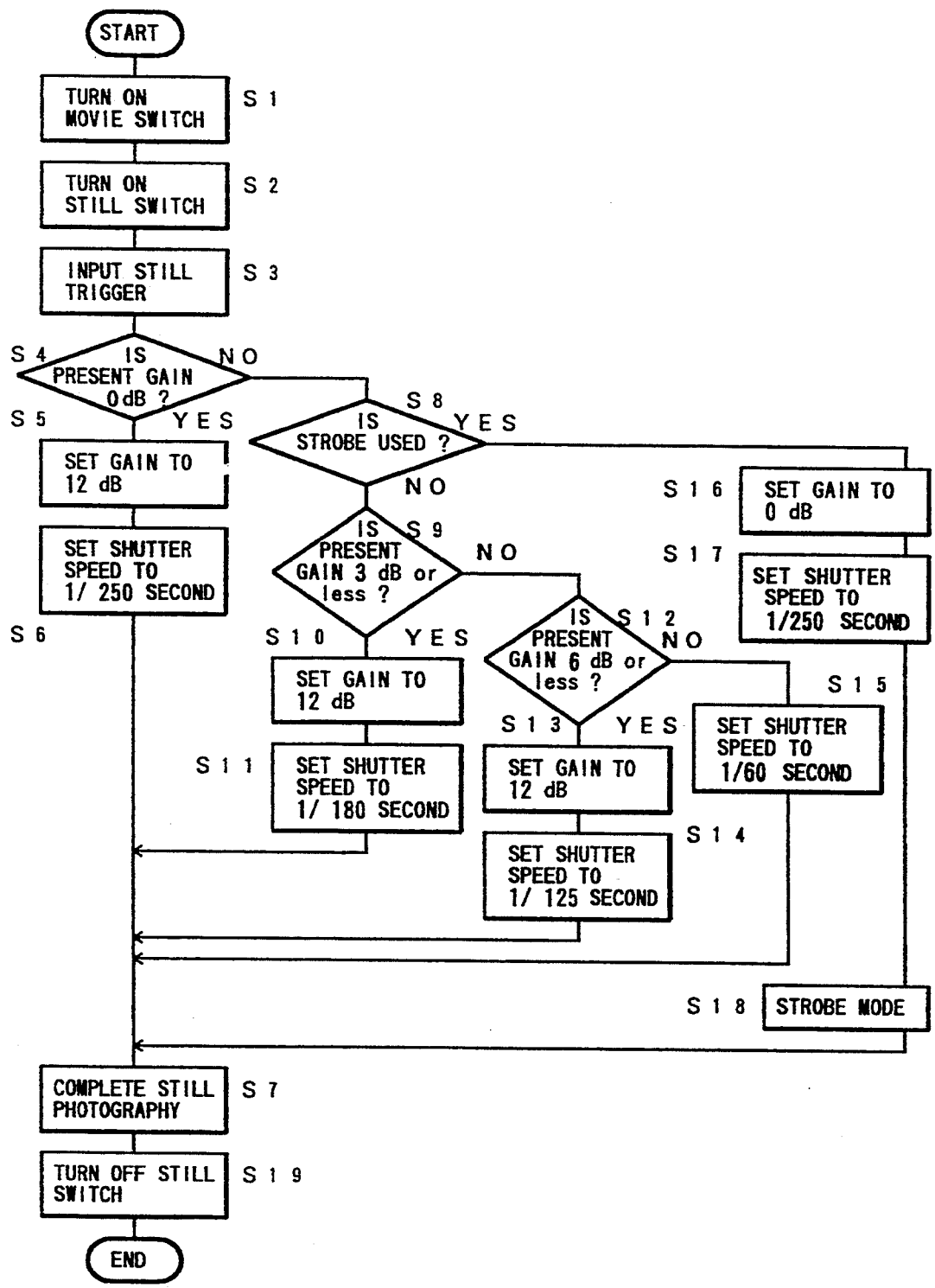
FIG. 3 is a flow chart for describing the operation of the movie camera shown in FIG. 1.

FIG. 3 is a flow chart for describing such an operation. This operation will be described below in accordance with the flow chart.

STEP S1

The photographer holds the grip 14 of the movie camera 10 and turns ON the movie switch 24. The movie switch 24 is of a switch including a re-lock mechanism. When the movie switch 24 is turned ON, the movie photography operation is initiated at a shutter speed of 1/60 second.

STEP S2

When it is desired to obtain a certain still in the course of the movie photography operation, the photographer turns ON the still switch 25.

STEP S3

When the still switch 25 is turned ON in STEP S2, a still photography triggering signal is supplied to the still controller 68 for thereby starting the still photography operation.

STEP S4

The CCD 30 photoelectrically reads information about an image of an object, which is formed by converging light with the lenses 26a, 26b. When the weak signal thus read is amplified by the AGC circuit 36 of the image processing unit 32, the still controller 68 determines at what decibel (dB) the gain of the AGC circuit 36 is represented. If it is determined that the gain of the AGC circuit 36 is of 0 dB, then the routine procedure proceeds to STEP S5. If the answer is determined to be no, then the routine procedure proceeds to STEP S8.

STEP S5

If the still controller 68 determines in STEP S4 that the gain of the AGC circuit 36 is of 0 dB, then the still controller 68 increases the gain of the AGC circuit 36 so as to be set to 12 dB.

STEP S6

When the gain of the AGC circuit 36 is set to 12 dB, the still controller 68 supplies a desired signal to the CCD drive circuit 80 as the electronic-shutter speed switching unit through the SSG circuit 82, for thereby setting the electronic shutter speed to 1/250 second. Incidentally, the F-number or the stop number is fixed to that at the time of the movie photography immediately before the still switch 25 is turned ON.

STEP S7

Under the condition set in STEP S6, the still photography operation is carried out thereby to complete still photography of one frame.

STEP S8

If it is determined in STEP S4 that the gain of the AGC circuit 36 is not of 0 dB when the weak signal read by the CCD 30 is amplified by the AGC circuit 36, then it is determined whether or not the still photography will be performed using the strobe 20. That is, the still controller 68 determines whether or not the strobe switch 19 has been turned ON. When the photographer desires to photograph an object in a synchro state during the day, for example, the strobe switch 19 disposed on the upper portion of a main body 12 of the movie camera 10 is turned ON.

STEP S9

If the still controller 68 determines that the strobe switch 19 has been not yet turned ON, then the still controller 68 determines whether or not the gain of the AGC circuit 36 is 3 dB or less. If the answer is determined to be yes, then the routine procedure proceeds to STEP S10. If the answer is determined to be no, then the routine procedure proceeds to STEP S12.

STEP S10

If it is determined in STEP S9 that the gain of the AGC circuit 36 falls between 0 dB and 3 dB, then the gain of the AGC circuit 36 is increased so as to be set to 12 dB.

STEP S11

When the gain of the AGC circuit 36 is set to 12 dB, the still controller 68 supplies a desired signal to the CCD drive circuit 80 for thereby setting the electronic shutter speed to 1/180 second. Incidentally, the stop number is fixed to that at the time of the movie photography immediately before the still switch 25 is turned ON. Under this setting, the routine procedure proceeds to STEP S7, where the still photography is made.

STEP S12

If it is determined in STEP S9 that the gain of the AGC circuit is not 3 dB or less when the weak signal read by the CCD 30 is amplified by the AGC circuit 36, then it is determined whether or not the gain of the AGC circuit 36 is 6 dB or less. If the answer is determined to be yes, then the routine procedure proceeds to STEP S13. If the answer is determined to be no, then the routine procedure proceeds to STEP S15, where the still photography is carried out at the electronic shutter speed of 1/60 second.

STEP S13

If it is determined in STEP S12 that the gain of the AGC circuit 36 falls between 3 dB and 6 dB, then the gain of the AGC circuit 36 is increased so as to be set to 12 dB.

STEP S14

When the gain of the AGC circuit 36 is set to 12 dB, the still controller 68 supplies a desired signal to the CCD drive circuit 80 so as to set the electronic shutter speed to 1/125 second. Incidentally, the stop number is fixed to that at the time of the movie photography immediately before the still switch 25 is turned ON. Under this setting, the routine procedure proceeds to STEP S7, where the still photography is performed.

STEP S15

If it is determined in STEP S12 that the gain of the AGC circuit 36 is not of 6 dB or less when the weak signal read by the CCD 30 is amplified by the AGC circuit 36, then the still controller 68 delivers a desired signal to the CCD drive circuit 80 so as to set the electronic shutter speed to 1/60 second. Incidentally, the stop number is fixed to that at the time of the movie photography immediately before the still switch 25 is turned ON. Under this setting, the routine procedure advances to STEP S7, where the still photography is made.

STEP S16

If the still controller 68 determines that the strobe switch 19 has been turned ON, then the still controller 68 controls the gain of the AGC circuit 36 so that its gain is set to 0 dB as the reference.

STEP S17

The still controller 68 supplies a desired signal to the CCD drive circuit 80 so as to set the electronic shutter speed to 1/250 second. Incidentally, the stop number is fixed to that at the time of the movie photography immediately before the still switch 25 is turned ON.

STEP S18

Under the conditions set in STEPS S16 and S17, an object is illuminated with stroboscopic flashes of light produced from the stroboscopic flashing light producing unit 98 of the strobe 20, for thereby photographing a motionless picture or still (hereinafter called a "strobe mode").

Figure 4:
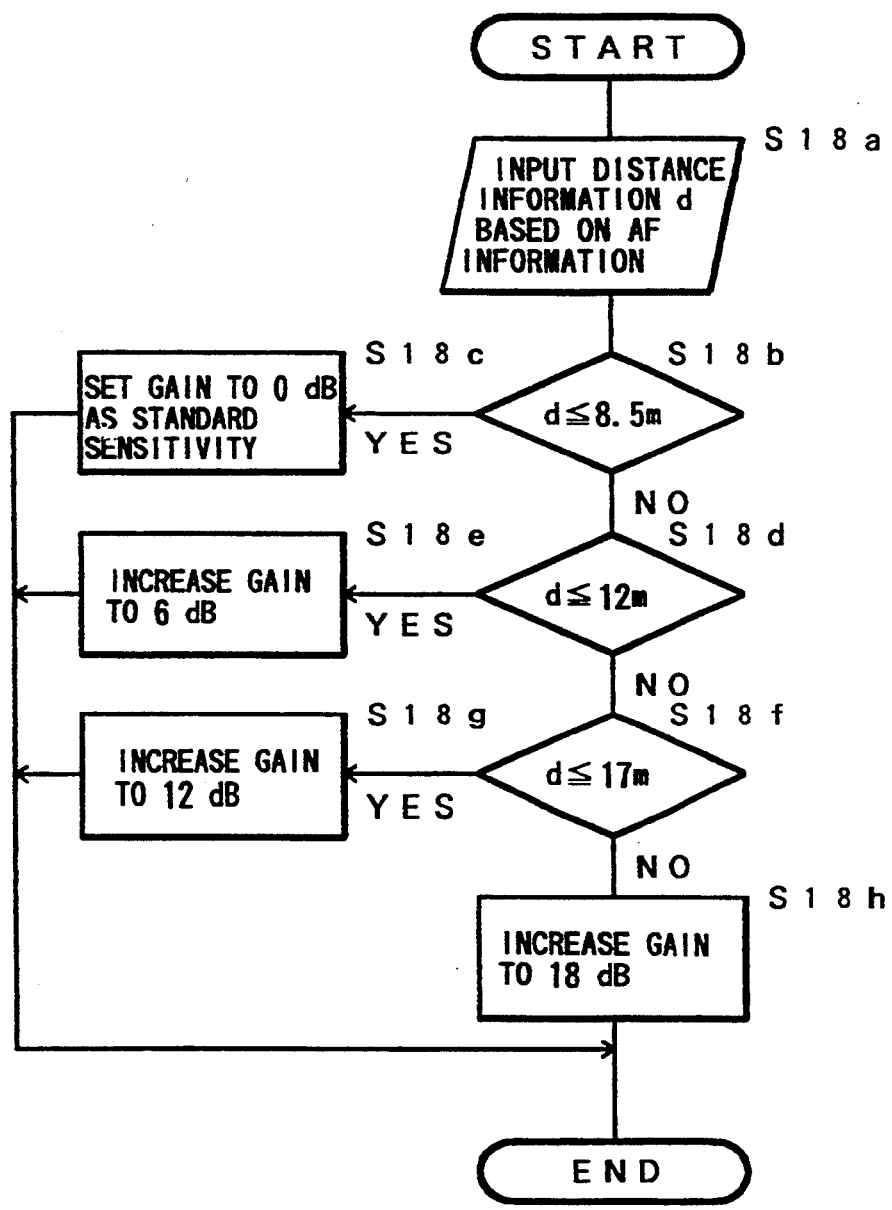
FIG. 4 is a subroutine flow chart for describing the operation of the movie camera in a strobe mode shown in the flow chart of FIG. 3.

FIG. 4 is a subroutine flow chart for describing the sequential operation taken in photographing the still while the object is being illuminated with the stroboscopic flashes of light. Its operation will be described below in accordance with the flow chart referred to above.

STEP S18a

The still controller 68 receives therein information d about the distance to an object, based on AF information from the focus position detector circuit 86.

STEP S18b

When the distance information d input to the still controller 68 in STEP S18a is 8.5 m or shorter, for example, the routine procedure proceeds to STEP S18c. If the above requirement is not met, then the routine procedure proceeds to STEP S18d.

The distance information d=8.5 m can be determined from the following equation:

F-number (F)=guide number/distance (m). To take the example when the guide number is 12 (normal or standard sensitivity) and the stop number F=1.4, the distance d is calculated to be about 8.5 meters.

STEP S18c

If the distance information d is less than or equal to 8.5 m, the AGC circuit 36 of the image processing unit 32 is controlled to set the gain of an electric signal into which a light signal has been converted by the CCD 30 to 0 dB as a reference level (hereinafter called "standard sensitivity"). Under this setting, an object is illuminated with stroboscopic flashes of light emitted from the stroboscopic flashing light producing unit 98 of the strobe 20 so as to enable the still photography.

STEP S18d

If the distance information d is less than or equal to 12 m, then the routine procedure proceeds to STEP S18e. If the distance information is not less than or equal to 12 m the routine procedure proceeds to STEP S18f.

STEP S18e

If the distance information d falls between 8.5 m and 12 m, then the AGC circuit 36 is controlled to increase the gain of the AGC circuit to 6 dB (hereinafter called a "6-dB gain up"), for thereby enabling the distance to an object to be lengthened.

STEP S18f

If the distance information d is less than or equal to 17 m, then the routine procedure proceeds to STEP S18g. If the distance information is not less than or equal to 17 m. then the routine procedure proceeds to STEP S18h.

STEP S18g

If the distance information d falls between 12 m and 17 m, then the AGC circuit 36 is controlled to increase the gain of the AGC circuit 36 to 12 dB (hereinafter called a "12-dB gain up") so as to lengthen the distance to the object, for thereby enabling the still photography.

STEP S18h

If the distance information d falls between 17 m and 24 m, then the AGC circuit 36 is activated to increase its gain to 18 dB (hereinafter called a "18-dB gain up") at a maximum so as to lengthen the distance to the object up to 24 m, for thereby enabling a motionless picture or still to be photographed in high quality.

Thus, the AGC circuit 36 is controlled based on the distance information d from the focus position detector circuit 86 for thereby enabling the distances to the object to be held within, for example, 8.5 m at the standard gain dB, 12 m at the 6-dB gain up, 17 m at the 12-dB gain up, and 24 m at the 18-dB gain up, respectively. As a result, the still can clearly be photographed in high quality while objects within the distances referred to above are illuminated with the stroboscopic flashes of light.

A description will now be made of a case in which an object is illuminated with stroboscopic flashes of light for thereby photographing a still in the course of the movie photography operation, with reference to a timing chart shown in FIG. 5.

As illustrated in FIG. 5, the still controller 68 supplies a sweeping signal to the CCD drive circuit 80 via the SSG circuit 82 in synchronism with the vertical synchronizing signal of 1/60 second. When the sweeping signal is input to the CCD drive circuit 80, the signal charges stored in the CCD 30 are discharged during a period of 1/60 second–1/250 second. Thus, the signal charges are stored in the CCD 30 only during a period of 1/250 second as the electronic shutter speed, and transferred as an image signal to the sample-and-hold circuit 34 from the CCD 30.

A description will now be made of the action of storing the signal charges in fields in the CCD 30 with reference to FIGS. 6(a) and 6(b).

FIGS. 6(a) and 6(b) show an odd-numbered field and an even-numbered field respectively. An assumption is now made that a plurality of pixels employed in the CCD 30 are simplified for convenience of illustration in a manner that each field includes 8 pixels. Each field in the CCD 30 includes a vertical transfer element, a light-sensitive element and a horizontal transfer element having one end used to output a signal therefrom.

A description will first be made of the odd-numbered field. A signal at an odd-numbered pixel as counted from a pixel provided near a horizontal transfer CCD and a signal at the next even-numbered pixel are simultaneously added together in the transfer element and the result of its addition is read therefrom. The signals referred to above show signal charges photoelectrically-converted in the respective pixels. A description will next be made of the even-numbered field. The combination of the addition of the signals is changed to another in the even-numbered field. That is, a signal at an even-numbered pixel as seen from below and a signal at the next even-numbered pixel are added together in the transfer element and the result of its addition is read therefrom. It is assumed in this case that signals at all of pixels of the light-sensitive elements are read for each field. The so-added signals are vertically-transferred to the horizontal transfer element which is in turn activated to successively transfer the signal charges stored therein to the output terminal thereof, for thereby enabling an output signal no be produced.

STEP S19

After either the normal still photography to be effected in STEP S7 or the still photography to be effected in STEP S18 in the strobe mode has been completed the still switch 25 is turned OFF to enable the movie photography operation again.

Within such a movie photography operation, when the still photography operation is carried out under the above-described conditions and the still photography portion is reproduced as part of a motion picture, no defects are observed in the motion picture.

As a result, even when the still photography is carried out during the movie photography operation and the movie photography operation is performed again, i.e., even if the photographed movie portion and the photographed still portion coexist with each other in a photographic film, the action of an object corresponding to the photographed still portion does not look artificial or awkward when the entire image or picture is reproduced as a motion picture. As a result, it is possible to reproduce the still as a picture or image similar to the photographed movie portion. This is because the still photography is performed at an electronic shutter speed faster than that at the time of the still photography when the still photography operation is initiated during the movie photography operation. Since the shutter speed is see to a higher shutter speed by the electronic shutter speed switching unit when the still photography operation is started, the still photography which takes preference of the shutter speed is made. This process is suited for photographing moving portions such as players who actively play sports such as rugby and soccer for example. It is thus possible to reproduce the moving portions as distinct motionless pictures or stills having an excellent quality.

A description will now be made of a case in which even if the illumination intensity, i.e., the illumination falling on an object is less than the minimum allowable value in the course of the movie photography of an object by the photographer, the strobe 20 automatically produces flashes of light in synchronism with the electronic shutter timing at the time of the still photography, for thereby making it possible to make longer the photographable maximum distance to the object to be photographed and to obtain an image whose quality is superb.

When the still switch 25 is first turned ON during the movie photography operation as described above, a triggering signal from the still switch 25 is supplied to the still controller 68 to change over each of the switches S1 through S5 to the S terminal, for thereby starting the still photography.

Then, the still controller 68 supplies a desired signal to the CCD drive circuit 80 via the SSG circuit 82 so as to set the electronic shutter speed at the time of the still photography to 1/500 second, for example. After the electronic shutter speed has been established, iris information about an object, which is output from the iris position detector 90 for detecting the opening and closing conditions of the iris, and the gain information output from the AGC circuit 36 are supplied to the still controller 68. The iris information and the gain information respectively show the f-number or stop number and the amplification factor or gain at the time of the movie photography immediately before the photography mode is changed to the still photography.

The still controller 68 now determines on the basis of the illumination falling on an object whether or not it is necessary to photograph a still in the strobe mode based on the aforementioned iris information and gain information.

If its illumination intensity is more than or equal to the minimum allowable value and hence the answer is determined to be no, then the still controller 68 outputs a signal indicative of the fact that the still photography will be performed without stroboscopic flashes of light, to the strobe control unit 96.

On the other hand, if the above illumination intensity is less than the minimum allowable value and hence the answer is determined to be yes, then a signal indicative of such contents is supplied to the strobe control unit 96.

If it is determined that it is necessary to produce flashes of light from the strobe according to the information about the result of the above determination, then the still controller 68 sets up white balance corresponding to the strobe photography and supplies a signal indicative of the set-up white balance information to the AWB circuit 54. After this set-up process has been made, the still controller 68 supplies a sweeping signal to the CCD drive circuit 80 via the SSG circuit 82 in synchronism with a vertical synchronizing signal of 1/60 second, which is output from the SSG circuit 82, as illustrated in FIG. 7. When the sweeping signal is input to the CCD drive circuit 80, the signal charges stored in the CCD 30 are discharged during a period of 1/60 second–1/500 second, and hence the signal charges are stored in the CCD 30 only during a period corresponding to an electronic shutter speed of 1/500 second and transferred as an image signal to the sample-and-hold circuit 34.

When the signal charges are stored in the CCD 30 only for 1/500 second in the above-described manner, the still controller 68 supplies a synchronizing signal to the strobe control unit 96 in synchronism with the electronic shutter timing to produce stroboscopic flashes of light from the stroboscopic flashing light producing unit 98 of the strobe 20, for thereby enabling the still photography.

Thus, the strobe 20 automatically emits or produces flashing light in unison with the electronic shutter timing at the time of the still photography when the illumination falling on the object is less than the minimum allowable value. Accordingly, a picture or image which is superior in S/N ratio can be photographed up to a distance of about 10 m under the standard sensitivity even if a light source (guide number: about 12) such as a small strobe provided in a compact camera, for example, is used. When the still controller 68 supplies a desired signal to the AGC circuit 36 so as to increase the gain of the AGC circuit 36 as the reference over a range from 0 dB through 6 dB and 12 dB up to 18 dB, the distance to the object to be photographed can be lengthened to a maximum of about 24 m under the conditions referred to above.

Since the property of the stroboscopic light is analogous to that of daylight as compared with the property of light from another artificial light source, a still can be photographed in the form of an image which is bright and distinct as a whole.

Further, the strobe flashing time is appreciably short. Therefore, even when it is desired to photograph objects (such as players who play sports such as rugby, soccer, etc.) which are quick in motion, reproduced stills having an excellent quality which are distinct, can be displayed or represented because of the still photography.

Upon the still photography, the still controller 68 supplies an index signal (not shown) indicative of the still photography to the image recording unit 59 in such a manner as to be recorded on a video tape. Thus, a desired motionless picture or still can quickly and easily be retrieved from a movie, i.e., motion pictures upon reproduction on the basis of the input index signal, for thereby making it possible to visually confirm the still as a hard copy in a short period of time.

As described above, if the object illumination determining unit judges or determines shortage of the illumination falling on an object when a still is photographed during the movie photography operation, then a strobe automatically produces flashing light in synchronism with the shutter timing of a high-speed operated shutter for thereby enabling instant photography. Thus, the still can be photographed without losing any chance to release a shutter. Even if the gain of an electric signal converted by a CCD is amplified so as to be brought into standard gain when the distance to an object is longer than that set in a conventional camera, a distinct image can be recorded. Thus, a desired signal, which is superior in S/N ratio, can be obtained by amplifying the gain of the electric signal in a manner so as to be brought into a standard state, for thereby making it possible to facilitate an image process.

Having now fully described the invention, it will be apparent to those skilled in the art that many changes and modifications can be made without departing from the spirit or scope of the invention as set forth herein.

What is claimed is:

1. A movie camera capable of producing a still photograph during a movie-photography operation, said camera comprising:
   strobe means for illuminating objects to be photographed with stroboscopic flashes of light;
   solid-state image sensing means for electrically converting image information from light incident thereon into movie and still image signals;
   gain control means for controlling the gain of image signals output from the solid-state image sensing means;
   video processing and recording means for processing said image signals into movie and still video signals and recording said video signals on the same video recording medium;
   movie-photography initiation means for starting a movie-photography operation in which a plurality of movie video signals are successively recorded on the video signal recording medium;
   still-photography initiation means for starting a still-photography operation in which still-photography video signals are recorded on the video recording medium, said still-photography initiation means being capable of starting the still-photography operation during the movie-photography operation;
   electronic shutter speed control means for setting the shutter speed of said solid-state image sensing means to desired values to control exposure times during the movie and still photography operations;
   shutter speed switching means responsive to the starting of a still-photography operation by the still-photography initiation means for automatically changing the shutter speed set by the shutter speed control means to a shutter speed that is faster than the shutter speed set for a concurrently proceeding movie-photography operation to thereby decrease the exposure time of still image signals in the solid-state image sensing means as compared to exposure times of the movie image signals;
   still-photography controller means for determining the gains set by said gain control means and for instructing said gain control means to increase the gain of output image signals to gains which compensate for the decrease in exposure time caused by the increased shutter speed during the still-photography operation, and for activating the strobe means to illuminate the objects with stroboscopic flashes of light to supplement the effects of the increased gain in order to further compensate for the decrease in exposure time; and
   means for automatically returning the movie camera to the movie-photography operation upon completion of the still-photography operation;
   whereby the movie-photography operation is not perceptively interrupted by the still-photography operation.

2. A movie camera according to claim 1, wherein said solid-state image sensing means comprises a CCD.

3. A movie camera according to claim 2, wherein said shutter speed switching means comprises:
   a CCD drive circuit for energizing said CCD; and
   an SSG circuit for supplying a vertical synchronizing signal to said CCD drive circuit;
   said shutter speed switching means supplying a sweep signal to said CCD drive circuit via said SSG circuit to cause image signal charges stored in said CCD to be discharged for a predetermined period of time, to thereby set the shutter speed to said faster shutter speed.

4. A movie camera according to claim 1, wherein said strobe means comprises:
   a charging unit for charging a battery;
   a strobe control unit for controlling said strobe means; and
   a stroboscopic flashing light producing unit for producing stroboscopic flashes of light powered by said battery;
   said still-photography controller means being activated to supply a desired signal to said strobe control unit thereby illuminating the object with the stroboscopic flashes of light.

5. A movie camera capable of producing a still photograph during a movie-photography operation, said camera comprising:
strobe means for illuminating objects to be photographed with stroboscopic flashes of light;
solid-state image sensing means for electrically converting image information from light incident thereon into movie and still image signals;
gain control means for controlling the gain of image signals output from the solid-state image sensing means;
video processing and recording means for processing said image signals into movie and still video signals and recording said video signals on the same video recording medium;
movie-photography initiation means for starting a movie-photography operation in which a plurality of movie video signals are successively recorded on the video signal recording medium;
still-photography initiation means for starting a still-photography operation in which still-photography video signals are recorded on the video recording medium, said still-photography initiation means being capable of starting the still-photography operation during the movie photography operation;
electronic shutter speed control means for setting the shutter speed of said solid-state image sensing means to desired values to control exposure times during the movie and still photography operations;
shutter speed switching means responsive to the starting of a still-photography operation by the still-photography initiation means for automatically changing the shutter speed set by the shutter speed control means to a shutter speed that is faster than the shutter speed set for a concurrently proceeding movie-photography-operation to thereby decrease the exposure time of still image signals in the solid-state image sensing means as compared to exposure times of the movie image signals;
still-photography controller means for instructing said gain control means to increase the gain of output image signals to gains which compensate for the decrease in exposure time caused by the increased shutter speed during the still-photography operation;
object illumination sensing means for determining whether or not the illumination falling on said object as sensed by the solid-state image sensing means has reached a predetermined value;
strobe controller means for activating said strobe means during said still-photography operation to generate said stroboscopic flashes of light when the illumination falling on the object is less than said predetermined value; and
means for automatically returning the movie camera to the movie-photography operation upon completion of the still-photography operation;
whereby the movie-photography operation is not perceptively interrupted by the still-photography operation.

6. A movie camera according to claim 5 wherein said solid-state image sensing means comprises a CCD.

7. A movie camera according to claim 6 wherein said shutter speed switching means comprises:
a CCD drive circuit for energizing said CCD; and
an SSG circuit for supplying a vertical synchronizing signal to said CCD drive circuit;
said shutter speed switching means supplying a sweep signal to said CCD drive circuit via said SSG circuit to cause image signal charges stored in said CCD to be discharged for a predetermined period of time, to thereby set the shutter speed to said faster shutter speed.

8. A movie camera according to claim 5, wherein said object illumination detection means comprises:
iris position detector means for determining the position of an iris in the movie camera which defines the size of an iris opening, and generating a position signal indicative of the size of the iris opening; and
means for determining from said position signal and the increased gain set by the gain control means if the illumination falling on the object as sensed by the solid-state image sensing means has reached said predetermined value.

9. A movie camera according to claim 5 wherein said strobe means comprises:
a charging unit for charging a battery;
a strobe control unit for controlling said strobe means; and
a stroboscopic flashing light producing unit for producing stroboscopic flashes of light powered by said battery;
said still-photography controller means being activated to supply a desired signal to said strobe control unit thereby illuminating the object with the stroboscopic flashes of light.

10. A movie camera capable of producing a still photograph during a movie-photography operation, said camera comprising:
solid-state image sensing means for electrically converting image information from light incident thereon into movie and still image signals;
gain control means for controlling the gain of image signals output from the solid-state image sensing means;
video processing and recording means for processing said image signals into movie and still video signals and recording said video signals on the same video recording medium;
movie-photography initiation means for starting a movie-photography operation in which a plurality of movie video signals are successively recorded on the video signal recording medium;
still-photography initiation means for starting a still-photography operation in which still-photography video signals are recorded on the video recording medium, said still-photography initiation means being capable of starting the still-photography operation during the movie photography operation;
electronic shutter speed control means for setting the shutter speed of said solid-state image sensing means to desired values to control exposure times during the movie and still photography operations;
shutter speed switching means responsive to the starting of a still-photography operation by the still-photography initiation means for automatically changing the shutter speed set by the shutter speed control means to a shutter speed that is faster than the shutter speed set for a concurrently proceeding movie-photography-operation to thereby decrease the exposure time of still image signals in the solid-state image sensing means as compared to exposure times of the movie image signals;

still-photography controller means for determining the gains set by said gain control means and for instructing said gain control means to increase the gain of output image signals to gains which compensate for the decrease in exposure time caused by the increased shutter speed during the still-photography operation;

means for automatically returning the movie camera to the movie-photography operation upon completion of the still-photography operation;

whereby the movie-photography operation is not perceptively interrupted by the still-photography operation.

11. A movie camera according to claim 10 wherein said solid-state image sensing means comprises a CCD.

12. A movie camera according to claim 10, wherein said shutter speed switching means comprises:
  a CCD drive circuit for energizing said CCD; and
  an SSG circuit for supplying a vertical synchronizing signal to said CCD drive circuit;
  said shutter speed switching means supplying a sweep signal to said CCD drive circuit via said SSG circuit to cause image signal charges stored in said CCD to be discharged for a predetermined period of time, to thereby set the shutter speed to said faster shutter speed.

13. A movie camera capable of producing a still photograph during a movie-photography operation, said camera comprising:
  strobe means for illuminating objects to be photographed with stroboscopic flashes of light;
  solid-state image sensing means for electrically converting image information from light incident thereon into movie and still image signals;
  video processing and recording means for processing said image signals into movie and still video signals and recording said video signals on the same video recording medium;
  movie-photography initiation means for starting a movie-photography operation in which a plurality of movie video signals are successively recorded on the video signal recording medium;
  still-photography initiation means for starting a still-photography operation in which still-photography video signals are recorded on the video recording medium, said still-photography initiation means being capable of starting the still-photography operation during the movie photography operation;
  electronic shutter speed control means for setting the shutter speed of said solid-state image sensing means to desired values to control exposure times during the movie and still photography operations;
  shutter speed switching means responsive to the starting of a still-photography operation by the still-photography initiation means for automatically changing the shutter speed set by the shutter speed control means to a shutter speed that is faster than the shutter speed set for a concurrently proceeding movie-photography-operation to thereby decrease the exposure time of still image signals in the solid-state image sensing means as compared to exposure times of the movie image signals;
  still-photography controller means for activating the strobe means to illuminate the objects with stroboscopic flashes of light in order to compensate for the decrease in exposure time; and
  means for automatically returning the movie camera to the movie-photography operation upon completion of the still-photography operation;
  whereby the movie-photography operation is not perceptively interrupted by the still-photography operation.

14. A movie camera according to claim 13 wherein said shutter speed switching means comprises:
  a CCD drive circuit for energizing said CCD; and
  an SSG circuit for supplying a vertical synchronizing signal to said CCD drive circuit;
  said shutter speed switching means supplying a sweeping signal to said CCD drive circuit via said SSG circuit to cause image signal charges stored in said CCD to be discharged for a predetermined period of time, to thereby set the shutter speed to said faster shutter speed.

15. A movie camera according to claim 14 wherein said strobe means comprises:
  a charging unit for charging a battery;
  a strobe control unit for controlling said strobe means; and
  a stroboscopic flashing light producing unit for producing stroboscopic flashes of light powered by said battery;
  said still-photography controller means being activated to supply a desired signal to said strobe control unit and thereby illuminating the object with the stroboscopic flashes of light.

16. A movie camera according to claim 13 wherein said solid-state image sensing means comprises a CCD.

17. A movie camera according to claim 16 wherein said shutter speed switching means comprises:
  a CCD drive circuit for energizing said CCD; and
  an SSG circuit for supplying a vertical synchronizing signal to said CCD drive circuit;
  said shutter speed switching means supplying a sweep signal to said CCD drive circuit via said SSG circuit to cause image signal charges stored in said CCD to be discharged for a predetermined period of time, to thereby set the shutter speed to said faster shutter speed.

18. A method of producing a still photograph with a movie camera having a still photographing function, comprising the steps of:
  (a) energizing still-photography triggering signal generating means so as to start a still photography operation;
  (b) reading image information of an object as an image signal by a CCD and determining by a still controller the gain of an AGC circuit obtained by amplifying said image signal with said AGC circuit;
  (c) recording said image signal on a video signal recording medium by video processing and recording means;
  (d) activating said still controller in a manner for determining whether a strobe switch has been brought to an on or off state, setting the gain of said AGC circuit determined in step (b) to a predetermined gain and setting the electronic shutter speed to a predetermined electronic shutter speed for photographing the still photograph;
  (e) processing and recording the still photograph from a still shot image signal immediately after the last movie image signal is generated during the movie photography operation on said video signal recording medium by said video processing and recording means, which records both the movie photography and the still photograph, by setting an exposure time of an electronic shutter shorter than that for the movie photography operation by controlling an accumulation time in a solid-state imaging element and adjusting the gain of the movie camera to compensate for shortage of said exposure time;

(f) flashing a strobe light onto the object when said gain has been maximized during the movie photography operation in order to supplement the effects of the adjusted gain; and (g) de-energizing said still-photography triggering signal generating means after said still photography has been completed, for thereby returning to the movie photography operation without a perceptible interruption of the movie photography operation.

19. A method according to claim 18, wherein step (d) further includes the steps of determining whether the gain of said AGC circuit is of 0 dB and said strobe switch has been brought to the off state, and if the gain of said AGC circuit is of 0 dB and said strobe switch has been brought to the off state, then activating said still controller to increase the gain of said AGC circuit to a given value and setting said electronic shutter speed to a first given electronic shutter speed.

20. A method according to claim 18, wherein step (d) further includes the steps of determining whether the gain of said AGC circuit fails between 0 dB and 3 dB and said strobe switch has been brought to the off state, and if the gain of said AGC circuit galls between 0 dB and 3 dB and said strobe switch has been brought to the off state, then activating said still controller to increase the gain of said AGC circuit to a given value and setting the electronic shutter speed to a second given electronic shutter speed for thereby producing a still photograph.

21. A method according to claim 18, wherein step (d) further includes the steps of determining whether the gain of said AGC circuit falls between 3 dB and 6 dB and said strobe switch has been brought to the off state, and if the gain of said AGC circuit falls between 3 dB and 6 dB and said strobe switch has been brought to the off state, then activating said still controller to increase the gain of said AGC circuit to a given value and setting the electronic shutter speed to a third given electronic shutter speed for thereby producing a still photograph.

22. A method according to claim 18, wherein step (d) further includes the steps of determining whether the gain of said AGC circuit is more than or equal to 6 dB and said strobe switch has been brought to the off state, and if the gain of said AGC circuit is more than or equal to 6 dB and said strobe switch has been brought to the off state, then activating said still controller to set the electronic shutter speed to a fourth given electronic shutter speed for thereby producing a still photograph.

23. A method according to claim 18, wherein step (d) further includes the steps of determining whether the gain of said AGC circuit is greater than or equal to 0 dB and said strobe switch has been brought to the on state, and if the gain of said AGC circuit is greater than or equal to 0 dB and said strobe switch has been brought to the on state, then activating said still controller to set the gain of said AGC circuit to 0 dB and setting the electronic shutter speed to the first given electronic shutter speed for thereby producing a still photograph in a strobe mode.

24. A method according to claim 23, wherein said strobe mode comprises the steps of:

(1) supplying distance information to an object to said still controller based on AF information from a focus position detector circuit;

(2) generating a desired signal from said still controller to set the gain of said AGC circuit to a first given value when said distance information supplied to said still controller in said step (1) is less than or equal to 8.5 m and supplying a desired signal to a strobe control unit from said still controller so as to produce stroboscopic flashes of light from a stroboscopic flashing light producing unit for thereby producing a still photograph;

(3) generating a desired signal from said still controller to set the gain of said AGC circuit to a second given value larger than said first given value when said distance information supplied to said still controller in said step (1) falls between 8.5 m and 12 m and supplying a desired signal to said strobe control unit from said still controller so as to produce stroboscopic flashes of light from said stroboscopic flashing light producing unit for thereby producing a still photograph;

(4) generating a desired signal from said still controller to set the gain of said AGC circuit to a third given value larger than said second given value when said distance information supplied to said still controller in said step (1) falls between 12 m and 17 m and supplying a desired signal to said strobe control unit from said still controller so as to produce stroboscopic flashes of light from said stroboscopic flashing light producing unit for thereby producing a still photograph; and (5) generating a desired signal from said still controller to set the gain of said AGC circuit to a fourth given value larger than said third given value when said distance information supplied to said still controller in said step (1) is more than or equal to 17 m and supplying a desired signal to said strobe control unit from said still controller so as to produce stroboscopic flashes of light from said stroboscopic flashing light producing unit for thereby producing a still photograph.

25. A method of producing a still photograph with a movie camera having a still photographing function, comprising the steps of:

(a) recording an image signal on a recording medium by a video head;

(b) energizing still-photography triggering signal generating means during a movie photography operation so as to start a still photography operation;

(c) supplying a desired signal to a CCD drive circuit from a still controller through an SSG circuit so as to set the electronic shutter speed to a given electronic shutter speed;

(d) inputting iris information of an object from an iris position detector used to detect the opening and closing conditions of an iris and gain information from an AGC circuit to said still controller and causing said still controller to determine based on said iris and gain information whether or not the illumination falling on the object falls within a minimum allowable value;

(e) causing said still controller to set up given white balance corresponding to strobe photography and supplying a signal indicative of the set-up white balance information to a balance control circuit if step (d) determines that the illumination falling on the object is within said minimum allowable value;

(f) activating said still controller in a manner to supply a sweep signal to said CCD drive circuit via said SSG circuit in synchronism with a vertical synchronizing signal of 1/60 second output from said SSG circuit;

(g) storing signal charges in said CCD according to the electronic shutter speed when said sweep signal is input to said CCD drive circuit and activating said still controller so as to supply a desired signal to a strobe control unit in synchronism with the timing of the electronic shutter speed for thereby energizing said strobe device in unison with the electronic shutter timing at the time of the still photography so as to enable said strobe device to automatically produce stroboscopic flashes of light;

(h) recording the still photograph on said recording medium by said video head in response to a still photography trigger after processing said image signal as in the movie photography operation by setting an exposure time of an electronic shutter shorter than that for the movie photography operation by controlling an accumulation time in a solid-state imaging element and adjusting the gain of the movie camera to compensate for shortage of said exposure time;

(i) flashing said strobe device when said gain has been maximized during the movie photography operation in order to supplement the effects of the adjusted gain; and (j) automatically returning the movie camera to the movie photography operation after said still photography trigger is effected for recording the still photography at step (h).

26. A method of producing a still photograph with a movie camera during a movie-photography operation, the steps of:

converting image information from light incident on an image sensing means into movie and still image signals;

processing and recording said image signals into movie and still video signals and recording said video signals on the same video recording medium;

starting a movie-photography operation in which a plurality of movie video signals are successively recorded on the video recording medium, starting a still-photography operation in which still-photography video signals are recorded on the video recording medium, said still-photography operation being started during the movie-photography operation;

setting the shutter speed of said solid-state image sensing means to desired values to control exposure times during the movie and still photography operations;

automatically changing in response to starting of the still-photography operation the shutter speed to one that is faster than the shutter speed set for a concurrently proceeding movie-photography operation to thereby decrease the exposure time of still image signals in the image sensing means as compared to exposure times of the movie image signals;

determining gains set by a gain control means on image signals output from said image sensing means during the movie-photography operation; and adjusting the gain of output image signals to gains which compensate for the decrease in exposure time caused by the increased shutter speed during the still-photography operation;

illuminating the objects with stroboscopic flashes of light to supplement the effects of the adjusted gain in order to further compensate for the decrease in exposure time; and automatically returning the movie camera to the movie-photography operation upon completion of the still-photography operation;

whereby the movie-photography operation is not perceptively interrupted by the still-photography operation.

27. A method of producing a still photograph with a movie camera during a movie-photography operation, the steps of:

converting image information from light incident on an image sensing means into movie and still image signals;

processing and recording said image signals into movie and still video signals and recording said video signals on the same video recording medium;

starting a movie-photography operation in which a plurality of movie video signals are successively recorded on the video recording medium, starting a still-photography operation in which still-photography video signals are recorded on the video recording medium, said still-photography operation being started during the movie-photography operation;

setting the shutter speed of said solid-state image sensing means to desired values to control exposure times during the movie and still photography operations;

automatically changing in response to starting of the still-photography operation the shutter speed to one that is faster than the shutter speed set for a concurrently proceeding movie-photography operation to thereby decrease the exposure time of still image signals in the image sensing means as compared to exposure times of the movie image signals;

determining gains set by a gain control means on image signals output from said image sensing means during the movie-photography operation; and adjusting the gain of output image signals to gains which compensate for the decrease in exposure time caused by the increased shutter speed during the still-photography operation; and automatically returning the movie camera to the movie-photography operation upon completion of the still-photography operation;

whereby the movie-photography operation is not perceptively interrupted by the still-photography operation.

28. A method of producing a still photograph with a movie camera during a movie-photography operation, the steps of:

converting image information from light incident on an image sensing means into movie and still image signals;

processing and recording said image signals into movie and still video signals and recording said video signals on the same video recording medium;

starting a movie-photography operation in which a plurality of movie video signals are successively recorded on the video recording medium, starting a still-photography operation in which still-photography video signals are recorded on the video recording medium, said still-photography operation being started during the movie-photography operation;

setting the shutter speed of said solid-state image sensing means to desired values to control exposure times during the movie and still photography operations;

automatically changing in response to starting of the still-photography operation the shutter speed to one that is faster than the shutter speed set for a concurrently proceeding movie-photography operation to thereby decrease the exposure time of still image signals in the image sensing means as compared to exposure times of the movie image signals;

illuminating the objects with stroboscopic flashes of light to supplement the effects of the shutter speed change in order to further compensate for the decrease in exposure time; and automatically returning the movie camera to the movie-photography operation upon completion of the still-photography operation;

whereby the movie-photography operation is not perceptively interrupted by the still-photography operation.

\* \* \* \* \*